US008160150B2

(12) United States Patent
Moore

(10) Patent No.: US 8,160,150 B2
(45) Date of Patent: Apr. 17, 2012

(54) METHOD AND SYSTEM FOR RATE DISTORTION OPTIMIZATION

(75) Inventor: Darnell J. Moore, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1020 days.

(21) Appl. No.: 12/100,274

(22) Filed: Apr. 9, 2008

(65) Prior Publication Data

US 2008/0253457 A1 Oct. 16, 2008

Related U.S. Application Data

(60) Provisional application No. 60/910,953, filed on Apr. 10, 2007.

(51) Int. Cl.
H04N 11/02 (2006.01)

(52) U.S. Cl. ......... 375/240.16; 375/240.01; 375/240.17; 375/240.24

(58) Field of Classification Search .............. 375/240, 375/240.01–240.03, 240.08, 240.12, 240.13, 375/240.16, 240.17, 240.24
See application file for complete search history.

(56) References Cited

U.S. PATENT DOCUMENTS

| 7,782,951 | B2 * | 8/2010 | Muthukrishnan et al. ............. | 375/240.16 |
|---|---|---|---|---|
| 2005/0135484 | A1 * | 6/2005 | Lee et al. ............. | 375/240.16 |
| 2006/0002474 | A1 * | 1/2006 | Au et al. ............. | 375/240.16 |
| 2007/0237232 | A1 * | 10/2007 | Chang et al. ............. | 375/240.16 |
| 2007/0274396 | A1 * | 11/2007 | Zhang et al. ............. | 375/240.24 |
| 2008/0056354 | A1 * | 3/2008 | Sun et al. ............. | 375/240.12 |
| 2008/0137726 | A1 * | 6/2008 | Chatterjee et al. ....... | 375/240.01 |
| 2008/0198934 | A1 * | 8/2008 | Hong et al. ............. | 375/240.22 |
| 2008/0212678 | A1 * | 9/2008 | Booth et al. ............ | 375/240.16 |
| 2009/0196342 | A1 * | 8/2009 | Divorra Escoda et al. ............. | 375/240.02 |

OTHER PUBLICATIONS

Jain, "Displacement Measurement and its Application in Interframe Image Coding", IEEE Transactions on Communications, vol. Com-29, No. 12, Dec. 1981, pp. 1799-1808.
Koga, "Motion-Compensated Adaptive Intra-Interframe Predictive Coding Algorithm", IEEE CH2 118-8/85/0000-0363, 1985, pp. 363-366.
Ninomiya, "A Motion-Compensated Interframe Coding Scheme for Television Pictures", IEEE Transactions on Communications, vol. Com-30, No. 1, Jan. 1982, pp. 201-211.
Texas Instruments, :A Robust Hierarchical Motion Estimation with Recurrent Vector Predictor Searching and Low Complexity, U.S. Appl. No. 11/533,466, filed Sep. 20, 2006.

\* cited by examiner

*Primary Examiner* — Kwang B Yao
*Assistant Examiner* — Nguyen Ngo
(74) *Attorney, Agent, or Firm* — Mirna Abyad; Wade J. Brady, III; Frederick J. Telecky, Jr.

(57) ABSTRACT

Method, video encoders, and digital systems are provide in which motion vector determination includes selecting a plurality of candidate motion vectors for a macroblock using a cost function including both a block distortion measure and a motion vector cost measure for single-partition motion vectors in the plurality of candidate motion vectors and using a cost function including a distortion measure without a motion vector cost measure for multi-partition motion vectors in the plurality of candidate motion vectors, and refining the plurality of candidate motion vectors to obtain a refined plurality of candidate motion vectors, wherein multi-partition motion vectors of the plurality of candidate motion vectors are refined using a cost function including a distortion measure without a motion vector cost measure and single-partition motion vectors of the plurality of candidate motion vectors are refined using a cost function including both a block distortion measure and a motion vector cost measure.

18 Claims, 7 Drawing Sheets

METHOD AND SYSTEM FOR RATE DISTORTION OPTIMIZATION

CROSS REFERENCE TO RELATED APPLICATIONS

The present application claims priority to U.S. Provisional Patent Application No. 60/910,953, filed on Apr. 10, 2007, entitled "Video Camera and Method" which is incorporated by reference. The following co-assigned patent application discloses related subject matter: U.S. patent application Ser. No. 11/533,466, filed on Sep. 20, 2006, entitled "A Robust Hierarchical Motion Estimation with Recurrent Vector Predictor Searching and Low Complexity."

BACKGROUND OF THE INVENTION

Imaging and video capabilities have become the trend in consumer electronics. Digital cameras, digital camcorders, and video cellular phones are common, and many other new gadgets are evolving in the market. Advances in large resolution CCD/CMOS sensors coupled with the availability of low-power digital signal processors (DSPs) has led to the development of digital cameras with both high resolution image and short audio/visual clip capabilities. The high resolution (e.g., sensor with a 2560×1920 pixel array) provides quality offered by traditional film cameras.

More generally, applications for digital video have transcended into the domain of necessary survival equipment for today's digital citizens. In fact, applications involving digital video are so pervasive that virtually all facets of modern life—business, education, entertainment, healthcare, security, and even religion—have been affected by their presence. Aiding in their proliferation, multiple international standards have been created with new ones under development. In the 1990s, low bit-rate applications designed for limited bandwidth video telephony and conferencing motivated early standards like MPEG-1 and H.261. These standards provide picture quality comparable to a movie on VHS tape. As more bandwidth became available, MPEG-2, MPEG-4, and H.263 arrived to provide improvements in compression efficiency and DVD movie quality. The latest video coding standards, like WMV9/VC-1 and H.264/MPEG-4 Part 10 (AVC), make use of several advanced video coding tools to provide compression performance that can exceed MPEG-2 by a factor of two but at the expense of much higher complexity.

Common to all of these coding standards is the compression of video in both space and time. However, at closer inspection, even video encoders of the same standard can be very different. In fact, encoders often use proprietary strategies to improve compression efficiency, which translates directly to better picture quality at a given bit-rate. As video-enabled products continue to be commoditized, picture quality is quickly becoming a distinguishing feature that can foretell success or failure in the marketplace. To build competitive solutions, it is especially imperative that these strategies provide good economy, e.g., better quality for minimal complexity.

Encoders deploy many different tools to reduce both the spatial redundancy of content in each frame and the temporal redundancy between frames. Prediction is the primary facility for eliminating redundancy. If the prediction is better, the coding efficiency is higher, along with the video quality. The initial frame in a video sequence is independently compressed similar to a JPEG image using spatial prediction, i.e., intra-prediction. The subsequent frames are predicted from frames that have already been encoded, i.e., inter-prediction. When block-based motion-compensated prediction is used to model change from frame-to-frame, only the differences between the current and predicted frames need to be encoded. This approach has been used in most modern video coders since the early 1980s.

To track visual differences from frame-to-frame, each frame is tiled into macroblocks. Block-based motion estimation algorithms generate a set of vectors to describe block motion flow between frames, thereby, constructing the motion-compensated prediction. The vectors are determined using block-matching procedures that try to identify the most similar blocks in the current frame with those that have already been encoded in prior frames. Block matching techniques assume that an object in a scene undergoes a displacement in the x- and y-directions between successive frames. This translational displacement defines the components of a two-dimensional motion vector.

Motion estimation can be performed within each component of a frame, but is typically only done for luma. In this case, the chroma vectors assume the same vector coordinates as the luma vectors, although some scaling may be required depending on chroma format. Macroblocks are formed by N×M pixels, where N=M=16 for H.264/AVC. In general, the search for the best match between frames is determined by minimizing the image distortion D, which can be calculated using various metrics. The sum of absolute difference (SAD) between pixel-wise values in a block in the current frame and a block from the reference frame is commonly used to determine D. That is, the SAD associated with the motion vector $v=(x,y)$ is given by $$D = SAD(v) = SAD(x, y) = \sum_{i=0}^{N-1} \sum_{j=0}^{M-1} |F_c(i, j) - F_r(x - i, y + j)|$$

where $F_c(i,j)$ is a pixel in the $i^{th}$ column and $j^{th}$ row in a macroblock in the current frame and $F_r(x+i,y+j)$ is the a co-located pixel in a reference frame with horizontal offset x and vertical offset y. Alternatively, the distortion can be represented as sum of squared error (SSE, but also called the sum of squared difference, SSD) such that $$D = SSE(v) = SSE(x, y) = \sum_{i=0}^{N-1} \sum_{j=0}^{M-1} (F_c(i, j) - F_r(x - i, y + j))^2.$$

Motion estimation algorithms usually define a sequence of ordered steps to methodically search for the vector $\hat{v}$ that minimizes the image distortion for each macroblock. Depending on each step's search pattern and search range, the distortion D is evaluated over P locations such that v spans an area $A=[v_1 \, v_2 \ldots v_P]$. In practice, A should be large enough to cover the anticipated block displacement. Measuring the distortion at fractional distances by interpolating between integer pixel locations is also commonly used to minimize block error, e.g., producing vectors with fractional components. Generally, increasing the search range, e.g., the size of set A, can improve the likelihood that the global minima is discovered; however, the search range is often constrained to keep complexity manageable, especially in resource constrained embedded devices. The vector $\hat{v}$ that minimizes D over area A for a given macroblock is selected such that $$\hat{v} = \min_{v \in A} \{SSE(v)\}$$

or $$v = \min_{v \in A} \{SAD(v)\}.$$

However, using D alone does not guarantee optimal coding efficiency.

In codecs with more advanced tools for motion estimation, a single N×M macroblock may be partitioned into a variety of smaller blocks. Block-matching using multiple, smaller sub-blocks can reduce a macroblock's overall image distortion. The macroblock's inter-prediction mode u indicates the sub-block partition configuration selected from the W different arrangements allowed. For example, when W=4, u=0 represents no partitioning, u=1 represents two N×M/2 sub-blocks, u=2 represents two N/2×M sub-blocks, and u=3 represents four N/2×M/2 sub-blocks. The inter-prediction mode for no partitioning may be referred to as the single-partition inter-prediction mode and the inter-prediction modes for multiple partitions may be referred to as multiple-partition inter-prediction modes. Each partition is represented by its own motion vector although partitions in a macroblock can have the same vector coordinates. Ideally, the mode u is selected to minimize the overall bit-rate required to describe the macroblock's prediction error, e.g., $$\text{Optimal Inter-Prediction Mode } \hat{u} = \min_{u \in W} \left\{ \sum_{k=0}^{K_u - 1} [v_u(k) + m_u(k) + d_u(k)] \right\},$$

$$0 \le u < W,$$

where each of the $K_u$ sub-blocks will require $v_u$ bits to represent the vector v, $m_u$ overhead bits for mode u, and $d_u$ bits to represent the block distortion residual.

In cases where parts of the frame contain lots of visual texture under motion, partitioning a macroblock into smaller independent sub-blocks may prove advantageous. While more bits are required to describe multiple partitions, e.g., $v_u$ bits tend to increase, the rate-to-distortion ratio may still be more favorable than using a single block if the overall image distortion is smaller, e.g., $$\min_{u \in W, u \ne 0} \left\{ \sum_{k=0}^{K_u - 1} [v_u(k) + m_u(k) + d_u(k)] \right\} < [v_u(0) + m_u(0) + d_u(0)]|_{u=0}.$$

In other cases where the image texture is smooth or uniform, a single vector per macroblock may provide a more attractive rate-to-distortion ratio. However, solving for the values of $v_u(k)$, $m_u(k)$ or $d_u(k)$ when k≠0 is a complex optimization problem requiring iterative calculations that are generally not well-suited for real-time or low-cost applications.

SUMMARY OF THE INVENTION

Embodiments of the invention provide methods, encoders, and digital systems that provide low-complexity rate distortion optimization techniques for motion estimation and mode selection that can operate under constant bit-rate (CBR) conditions. More specifically, embodiments of the invention provide for both macroblock mode selection as well as motion vector selection using a cost function that includes both a distortion measure and a motion vector cost measure for some candidate motion vectors, i.e., single-partition motion vectors, while other candidate motion vectors, i.e., multi-partition motion vectors, are selected using a cost function composed of only a distortion measure without a motion vector cost measure.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
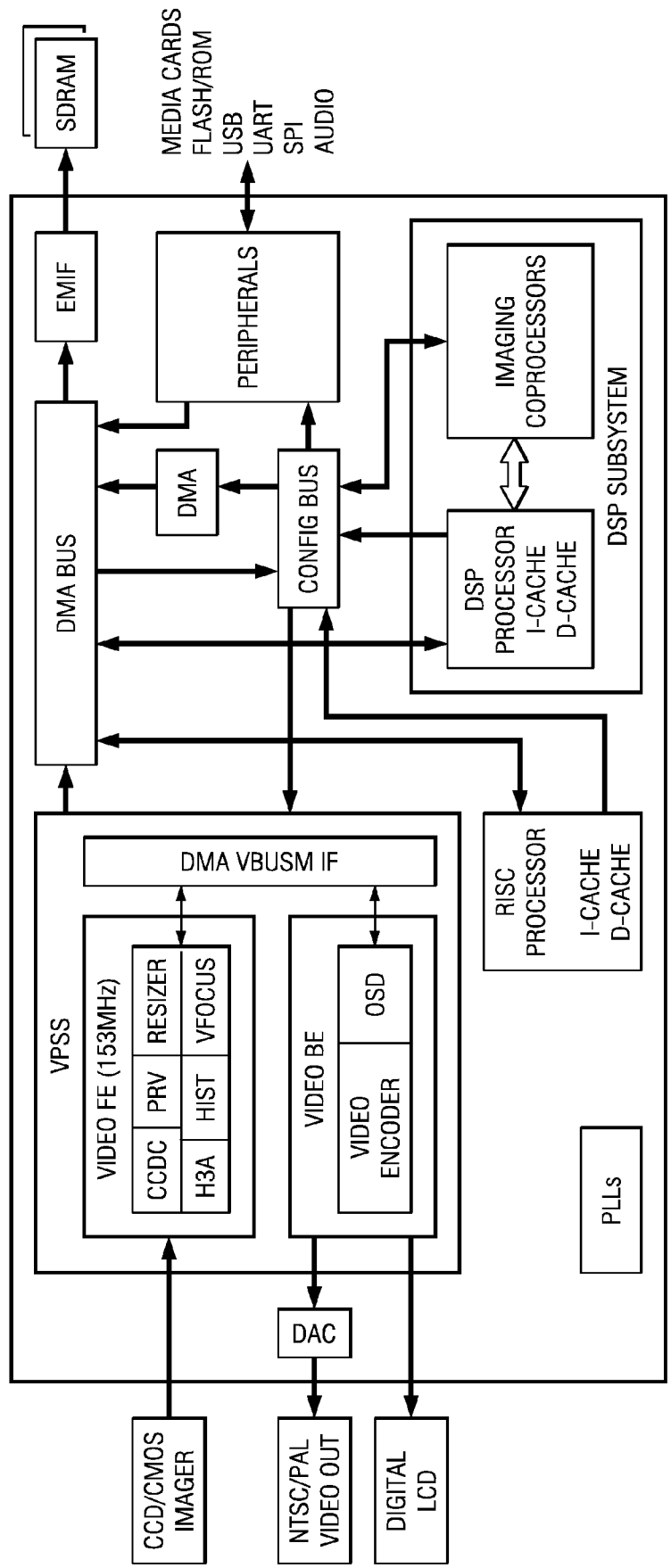
FIG. 1 shows a digital system including a video encoder in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, while various embodiments of the invention are described herein in accordance with the H.264 video coding standard, embodiments for other video coding standards will be understood by one of ordinary skill in the art. Accordingly, embodiments of the invention should not be considered limited to the H.264 video coding standard.

In general, embodiments of the invention provide methods, encoders, and digital systems that provide low-complexity rate distortion optimization techniques for motion estimation and mode selection that can operate under constant bit-rate (CBR) conditions. More specifically, embodiments of the invention provide for both macroblock mode selection as well as motion vector selection using a cost function that includes both a distortion measure and a motion vector cost measure for some candidate motion vectors while other candidate motion vectors are selected using a cost function composed of only a distortion measure without a motion vector cost measure. In one or more embodiments of the invention, integer-pel and sub-integer pel block matching use a cost function that includes both a block distortion measure and a motion vector cost measure for the single-partition mode while using a cost function including only a distortion measure for multiple-partition modes.

In addition, to lower complexity, in some embodiments of the invention, final inter-prediction mode selection is performed after refined integer-pel motion vector candidates are available rather after sub-integer-pel refinement as is generally done in the prior art. This final inter-prediction mode selection uses a cost function that includes both a distortion measure and a motion vector cost measure when considering candidate motion vectors for the single-partition mode. Embodiments of the invention also provide a novel expression for the Lagrangian Cost Criterion, one example of a cost function that includes both a distortion measure and a motion vector cost measure.

Figure 2:
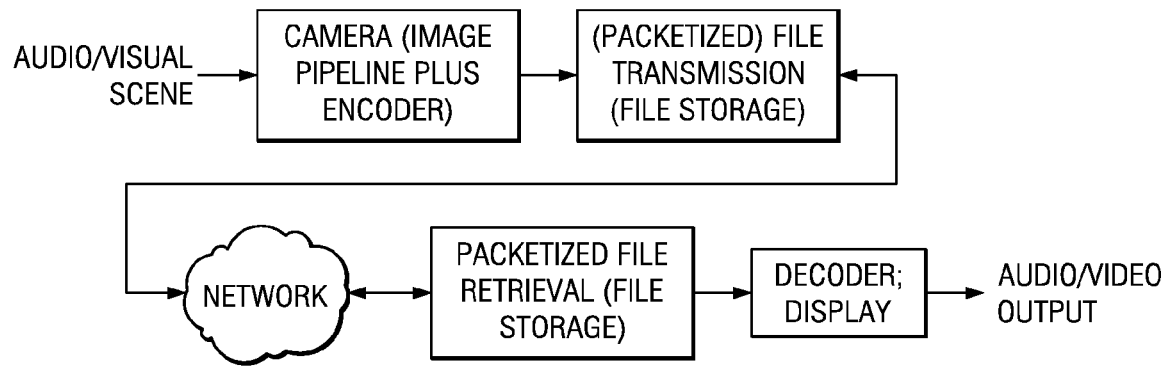
FIG. 2 shows a networked system in accordance with one or more embodiments of the invention.

Embodiments of the encoders and methods described herein may be provided on any of several types of digital systems: digital signal processors (DSPs), general purpose programmable processors, application specific circuits, or systems on a chip (SoC) such as combinations of a DSP and a RISC processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet; see FIG. 2.

FIG. 1 shows a digital system in accordance with one or more embodiments of the invention that includes, among other components, a DSP, a RISC Processor, and a video processing subsystem (VPSS) that may be configured to provide rate distortion optimization techniques as described herein. The VPSS includes a configurable video processing front-end (Video FE) input interface used for video capture from imaging peripherals such as image sensors, video decoders, etc., and a configurable video processing back-end (Video BE) output interface used for display devices such as SDTV displays, digital LCD panels, HDTV video encoders, etc.

The Video FE includes a CCD controller (CCDC), a preview engine (PRV), an image resizer (Resizer), an image statistics component (Hist), and modules for handling automatic exposure, automatic focus, automatic white balance, etc. (H3A and Vfocus). The CCDC is capable of interfacing to common video decoders, CMOS sensors, and charge coupled devices (CCDs). More specifically, the CCDC may accept raw image/video data from a sensor (CMOS or CCD) and can accept YUV video data in numerous formats. The PRV is a real-time image processing engine that takes raw imager data from a CMOS sensor or a CCD and converts from an RGB Bayer pattern to YUV4:2:2. The HIST and H3A modules provide statistical information on the raw color data. More specifically, the H3A module includes functionality to support control loops fro auto focus, and auto exposure by collection metric on the raw image data from the CCDC. The HIST module includes functionality to bin input color pixels, depending on the amplitude, and to provide statistics required to implement various H3A algorithms. The Resizer includes functionality to size input image data to the desired display or video encoding resolution and accepts image data for separate horizontal and vertical resizing from ¼× to 4× in increments of 256/N, where N is between 64 and 1024.

The Video BE includes an on-screen display engine (OSD) and a video encoder (Video Encoder). The OSD include functionality to manage display data in various formats for several different typed of hardware display windows and it also handles gathering and blending of video data and display/bitmap data into a single display window before providing the data to the Video Encoder in YCbCr format. The OSD is capable of handling two separate video windows and two separate OSD windows. Other configurations may include two video windows, one OSD window, and one attribute window allowing up to eight levels of alpha blending. The Video Encoder includes functionality to take the display frame from the OSD and format it into the desired output format and output signals required to interface to display devices. The Video Encoder may interface to composite NTSC/PAL video devices, S-Video devices, digital LCD devices, high-definition video encoders, DVI/HDMI devices, etc.

Figure 3:
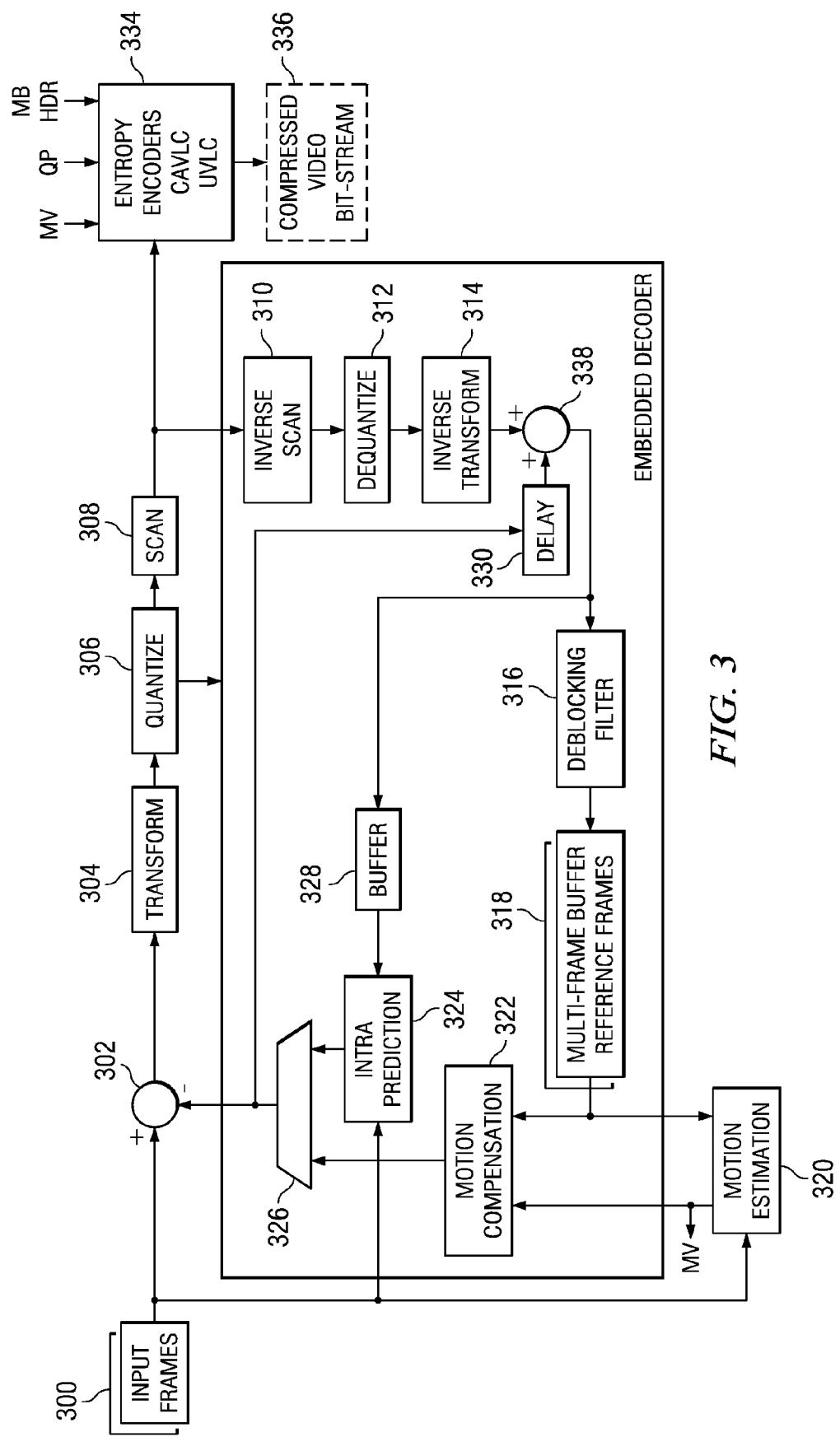
FIG. 3 shows a block diagram of a video encoder in accordance with one or more embodiments of the invention.

FIG. 3 shows a block diagram of a video encoder (e.g., Video Encoder of FIG. 1) in accordance with one or more embodiments of the invention. More specifically, FIG. 3 shows the basic coding architecture of an H.264 encoder. Embodiments of the methods for rate distortion optimization described below may be provided as part of the motion estimation component (320). More specifically, for each macroblock the output of the motion estimation component (320) is a set of motion vectors (MVs) and the corresponding mode, which may be selected using methods described below.

In the video encoder of FIG. 3, input frames (300) for encoding are provided as one input of a motion estimation component (320), as one input of an intraframe prediction component (324), and to a positive input of a combiner (302) (e.g., adder or subtractor or the like). The frame storage component (318) provides a reference frame to the motion estimation component (320) and to the motion compensation component (322). The reference frame includes one or more previously encoded and decoded frames. The motion estimation component (320) provides motion estimation information to the motion compensation component (322) and the entropy encoders (334). Specifically, the motion estimation component (320) provides the selected motion vector (MV) or vectors and the selected mode to the motion compensation component (322) and the selected motion vector (MV) to the entropy encoders (334). The motion compensation component (322) provides motion compensated prediction information to a selector switch (326) that includes motion compensated interframe macro blocks and the selected mode. The intraframe prediction component also provides intraframe prediction information to switch (326) that includes intraframe prediction macroblocks.

The switch (326) selects between the motion-compensated interframe macro blocks from the motion compensation component (322) and the intraframe prediction macroblocks from the intraprediction component (324) based on the selected mode. The output of the switch (326) (i.e., the selected prediction MB) is provided to a negative input of the combiner (302) and to a delay component (330). The output of the delay component (330) is provided to another combiner (i.e., an adder) (338). The combiner (302) subtracts the selected prediction MB from the current MB of the current input frame to provide a residual MB to the transform component (304). The transform component (304) performs a block transform, such as DCT, and outputs the transform result. The transform result is provided to a quantization component (306) which outputs quantized transform coefficients. Because the DCT transform redistributes the energy of the residual signal into the frequency domain, the quantized transform coefficients are taken out of their raster-scan ordering and arranged by significance, generally beginning with the more significant coefficients followed by the less significant by a scan component (308). The ordered quantized transform coefficients provided via a scan component (308) are coded by the entropy encoder (334), which provides a compressed bitstream (336) for transmission or storage.

Inside every encoder is an embedded decoder. As any compliant decoder is expected to reconstruct an image from a compressed bitstream, the embedded decoder provides the same utility to the encoder. Knowledge of the reconstructed input allows the encoder to transmit the appropriate residual energy to compose subsequent frames. To determine the reconstructed input, the ordered quantized transform coefficients provided via the scan component (308) are returned to their original post-DCT arrangement by an inverse scan component (310), the output of which is provided to a dequantize component (312), which outputs estimated transformed information, i.e., an estimated or reconstructed version of the transform result from the transform component (304). The estimated transformed information is provided to the inverse transform component (314), which outputs estimated residual information which represents a reconstructed version of the residual MB. The reconstructed residual MB is provided to the combiner (338). The combiner (338) adds the delayed selected predicted MB to the reconstructed residual MB to generate an unfiltered reconstructed MB, which becomes part of reconstructed frame information. The reconstructed frame information is provided via a buffer (328) to the intraframe prediction component (324) and to a filter component (316). The filter component (316) is a deblocking filter (e.g., per the H.264 specification) which filters the reconstructed frame information and provides filtered reconstructed frames to frame storage component (318).

To aid in comprehension of the description of embodiments of the rate distortion optimization method below, a discussion of motion vector cost computation and macroblock motion vector prediction is first provided. CBR rate control dynamically adjusts quantization levels based on the target transmission bit-rate and the output buffer-fullness levels. For example, increasing the quantization step, q, produces fewer and coarser transform coefficients, which result in fewer and/or shorter code words, and consequently smaller bit-rates. Embodiments of the rate distortion optimization method presented herein interact with CBR rate control to help manage bit-rate and distortion. More specifically, both rate and distortion are considered when selecting the mode of a macroblock using the familiar Lagrangian cost function $$J=D+\lambda R,$$

where D is the image distortion, $\lambda$ is the Lagrangian multiplier, and R is the rate. This expression is known to provide an optimal solution to the rate-distortion dilemma. However, measuring J is non-trivial. Measuring both the rate and the distortion in bits requires transforming, quantizing, and entropy encoding the distortion—an expensive proposition. Instead, the Lagrangian multiplier maps rate for more relative comparison to distortion. The scaled rate component $\lambda R$, e.g., motion vector cost, is routinely added to the distortion metric. Further, $\lambda$ is defined empirically (for each video standard) based on the quantization parameter q. The rate R is determined heuristically using the mode bits m and corresponding motion vector bits v. When the distortion metric uses the SSE, the Lagrangian cost for vector v and quantization $q \in \{1, 2, \ldots 51\}$ is provided by $$J(v, q, v, m) = SSE(v) + \lambda(q) \times \left(v^2 + \frac{m}{\alpha}\right),$$

where $\alpha$ is a constant ($\alpha=2$ for H.264/AVC). When the distortion metric uses the SAD, the cost function becomes $$J(v, q, v, m) = SAD(v) + \lambda(q) \times \left(v + \frac{m}{\alpha}\right).$$

In one or more embodiments of the invention, from experimentation using H.264/AVC, $\lambda$ may be defined to be the discrete array with 52-elements indexed by q such that $\lambda = \{1,1,1,1,1,1,1,1,1,1,1,1,1,1,1,2,2,2,2,3,3,3,4,4,4,5,$
$6,6,7,8,9,10,11,13,14,16,17,20,23,25,29,32,36,$
$41,46,53,59,66,74,83\}.$ However, this representation for the Lagrangian multiplier is not unique or necessarily optimal. Accordingly, other value of $\lambda$ may be used in other embodiments of the invention and/or for other video compression standards.

The Lagrangian cost J generally satisfies the criteria for the selection of macroblock inter-prediction modes better than distortion D alone. As such, it should ideally be applied during each block-matching procedure. There are, however, some circumstances where it is not advisable to use J to select or refine motion vectors during motion estimation, namely during the initial search steps or during search steps when frame resolution has been down-sampled. More will be said about this below.

Turning to macroblock motion vector selection, to boost compression, the residual coding framework used by H.264/AVC not only encodes image prediction error, but vector predictor error as well. Generally, the motion vectors of neighboring partitions are highly correlated. Vector coding leverages this correlation by generating the predicted vector using the vectors of neighboring partitions that have been previously encoded. A separable median filter is used to predict the vector of each block so that only the vector residuals, e.g. the difference between the predicted and actual partition vector, require coding.

Figure 4:
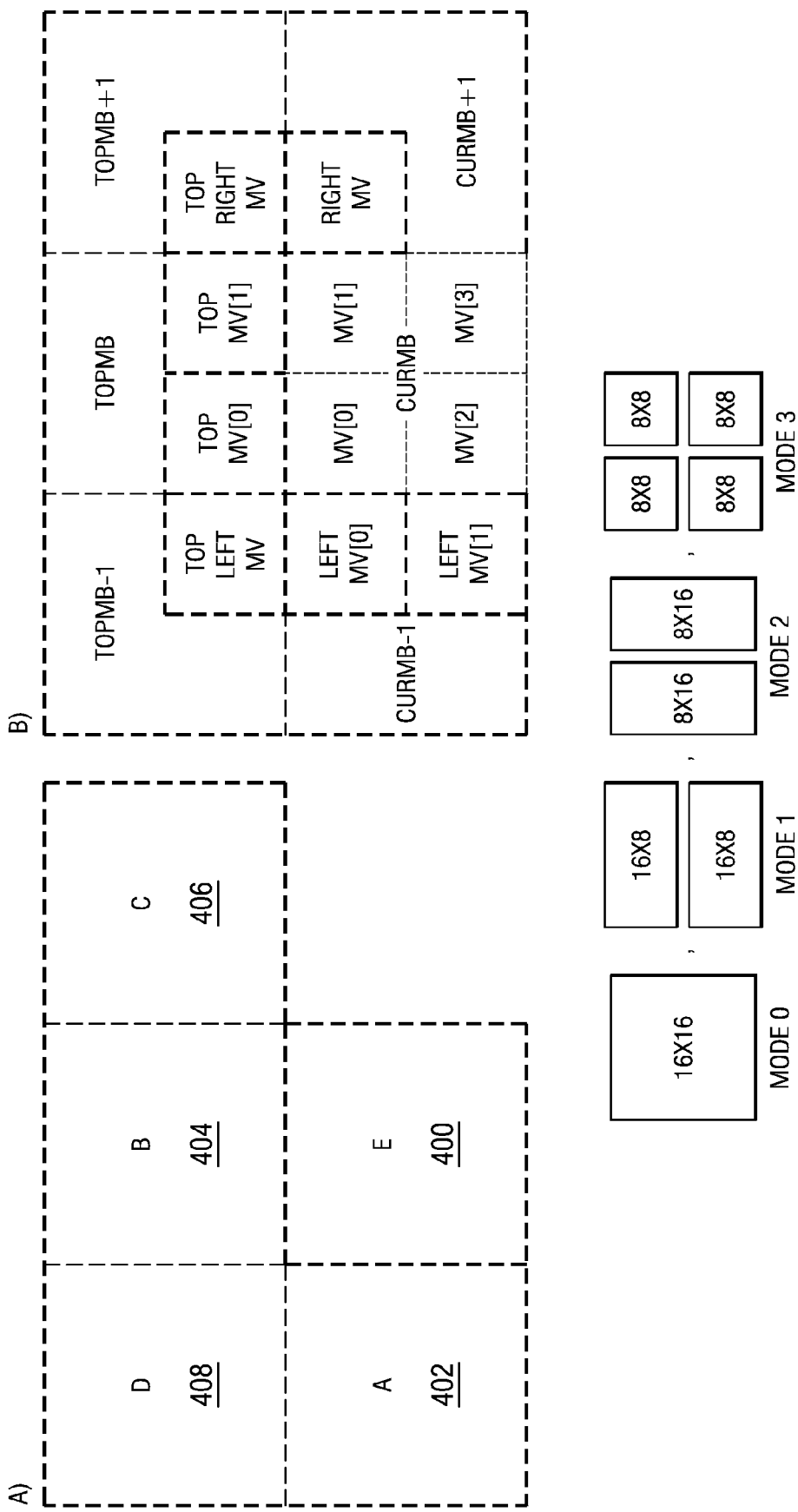
FIG. 4 shows an example of vector context in accordance with one or more embodiments of the invention.

The following table, Table 1, together with FIG. 4, show an example of vector context for the current block E (400). For example, the block A (402) is the partition to the left of block E (400), while block B (404) is the partition to the top of block E (400), and so on. Note that a partition may be a sub-block or an entire macroblock. A block's context is influenced by the inter-prediction mode and by its neighboring blocks and their corresponding vectors. The vectors from neighboring blocks A (402), B (404), and C (406) or D (408) must be known before median filtering is used to determine the predicted motion vector. The prediction also depends on the partition shape, the availability of adjacent vectors, the number of reference frames, as well as the presence of nearby skipped blocks. This dependency makes it very challenging to accurately predict vectors for multiple partitions. Accurately determining the predicted motion vector for all of the relevant macroblock modes, and ultimately the corresponding motion vector cost with these dependencies in mind, requires complex iterative estimation of each candidate vector, which by itself requires many SSE/SAD calculations. There is no dependency when non-partitioned macroblocks (which may also be referred to as single-partition macroblocks) are considered because the neighboring blocks have already been coded. Estimating only the single-partition motion vector (e.g., the 16×16 motion vector) is much less complicated, which motivates the way in which application of motion vector cost is applied within the motion estimation methods described below.

TABLE 1

|      | Mode 0      | Mode 1                   | Mode 2                     | Mode 3                                                |
|------|-------------|--------------------------|----------------------------|-------------------------------------------------------|
| If A | leftMV[0]   | leftMV[0]<br>leftMV[1]   | leftMV[0]<br>MV[0]         | leftMV[0]<br>MV[0]<br>leftMV[1]<br>MV[2]              |
| If B | topMV[0]    | topMV[0]<br>MV[0]        | topMV[0]<br>topMV[1]       | topMV[0]<br>topMV[1]<br>MV[0]<br>MV[1]                |
| If C | topRightMV  | topRightMV<br>leftMV[0]  | topMV[1]<br>topRightMV     | topMV[1]<br>topRightMV<br>MV[1]<br>MV[0]              |
| If D | topLeftMV   | topLeftMV<br>leftMV[0]   | topLeftMV<br>topMV[0]      | topLeftMV<br>topMV[0]<br>leftMV[0]<br>MV[0]           |

Figure 5:
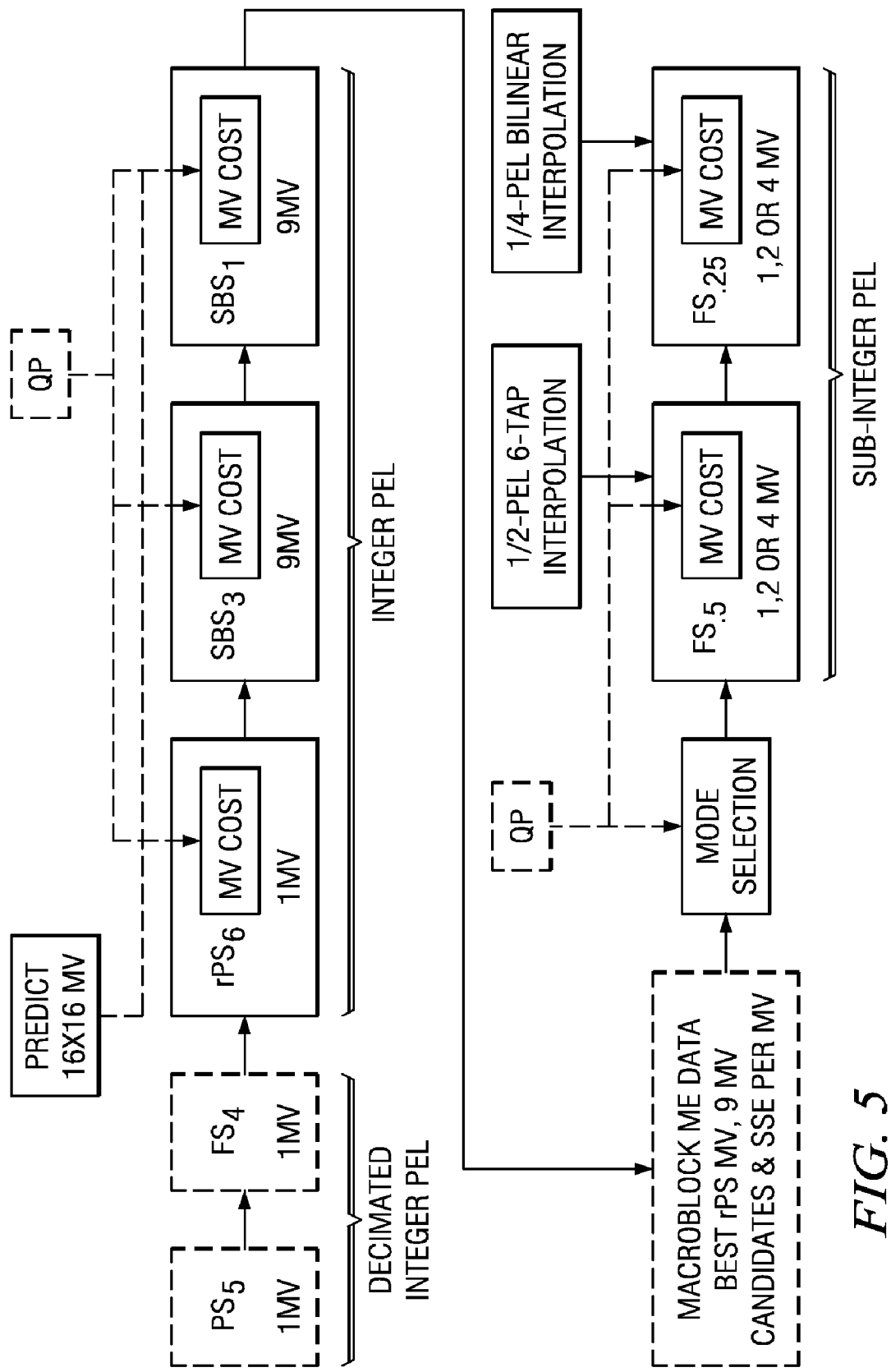
FIG. 5 shows a functional block diagram of motion vector determination in accordance with one or more embodiments of the invention.
Figure 7:
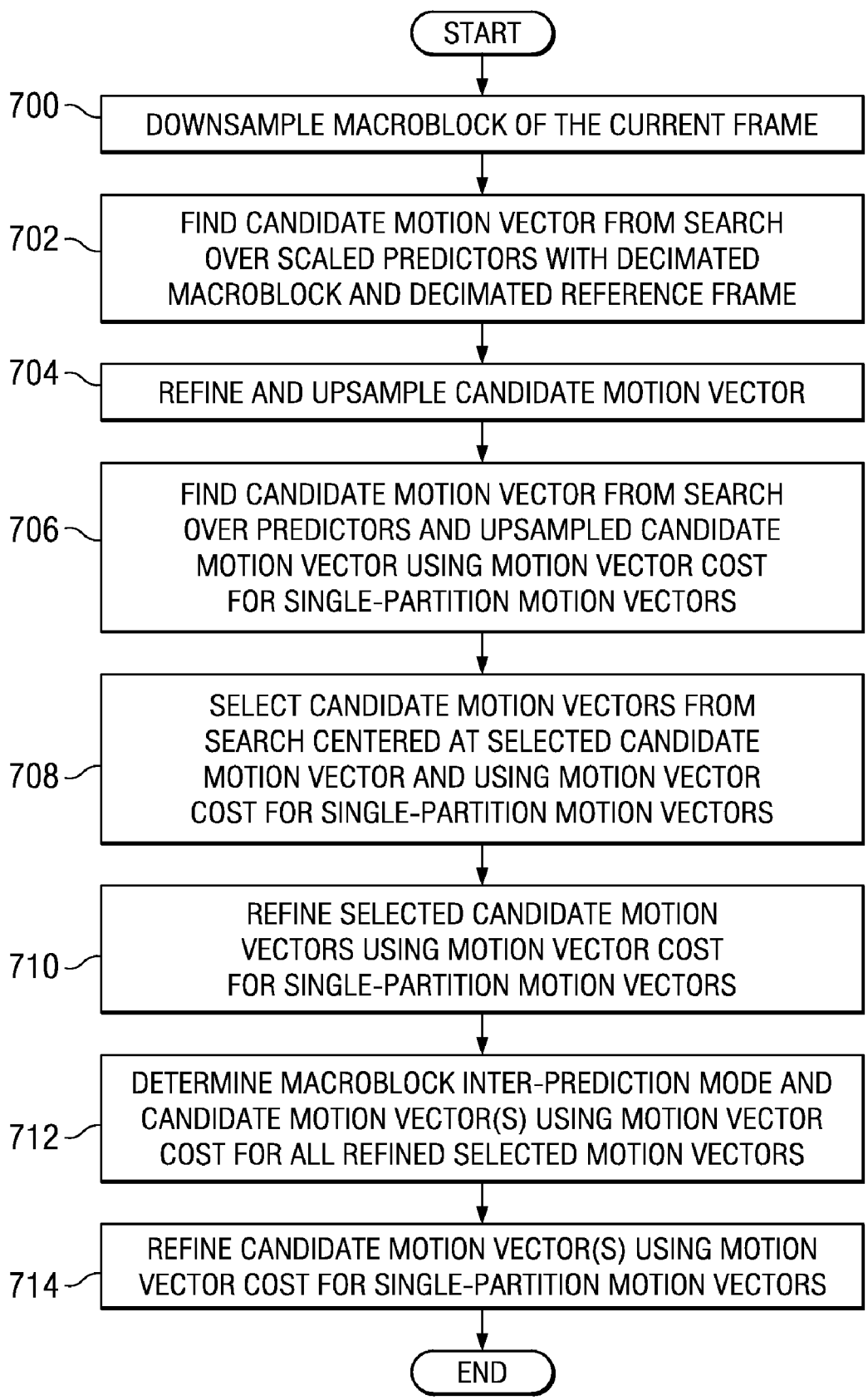
FIG. 7 shows a flow diagram of a method for motion vector determination in accordance with one or more embodiments of the invention.

FIGS. 5 and 7 are a functional block diagram and a flow graph, respectively, of a method for motion vector determination in accordance with one or more embodiments of the invention. In embodiments of the method, macroblock vectors are hierarchically searched and refined at four different resolution levels. Further, embodiments of the method may be used with rate control enabled (CBR) or disabled (variable bit-rate—VBR). More specifically, the method of FIGS. 5 and 7 is a telescopic motion estimation method originally designed to support only a single partition with no motion vector cost that is enhanced to use up to four motion vectors per macroblock and to use the novel rate distortion optimization techniques described herein as part of selecting the most economical motion vectors and inter-prediction mode. The hierarchical search includes three stages of motion estimation: a decimated-pel stage that operates on a downsampled version of a reference frame, an integer-pel stage that performs block matching using full-resolution frame pels, and a sub-integer-pel stage which operates on up-sampled resolution pels. In the second and third stages, a motion vector cost (MVCost) computed as described herein is used as part of selecting the motion vector(s). Further, the inter-prediction mode is selected between the integer-pel stage and the sub-integer-pel stage and MVCost is used in the selection process.

Before motion vector determination for the macroblocks of a video frame begins, a decimated reference frame of a prior encoded frame is needed. A block-based averaging filter may be used to downsample the reference frame by 4 in each dimension. Once the decimated reference frame is generated, motion vector determination for each macroblock in the video frame is performed as shown in FIGS. 5 and 7. First, a macroblock of the current frame is downsampled (700). In one or more embodiments of the invention, each 16×16 macroblock of the current frame is down-sampled by 4 in each dimension, yielding a 4×4 block. This 4×4 block is compared with 4×4 regions in the decimated reference frame. Each region is specified by a motion vector (MV) denoting the translational distance from the current 4×4 block (down-sampled macroblock) position.

A candidate motion vector is then found from a search over scaled predictors with the decimated macroblock and the decimated reference frame (702). More specifically, in one or more embodiments of the invention, a five predictor search (denoted as $PS_5$ in FIG. 5) is performed with the following five motion vector predictors scaled by a factor of 4:

Pzero, which identifies the absolute position of the macroblock in the frame and thus is the MV with both components equal to 0;

$P_{(0,0)}$, which identifies the MV used by the co-located macroblock in the prior encoded frame;

$P_{(0,-1)}$, which identifies the MV used by the (already-encoded) macroblock in the current frame and along the top border of the current macroblock;

$P_{(-1,0)}$, which identifies the MV used by the (already encoded) macroblock in the current frame and to the left of the current macroblock; and $P_{(-1,-1)}$, which identifies the MV used by the (already encoded) macroblock in the current frame and to the top-left of the current macroblock;

This five predictor search selects the one of the five predictors which provides the minimum 4×4 SSE as the candidate motion vector $MV_{Dec}$.

The selected candidate motion vector $MV_{Dec}$ is then refined and upsampled (704). More specifically, in one or more embodiments of the invention, the candidate motion vector selected by the five predictor search is refined using a full search in the down-sampled or decimated frame (denoted as $FS_4$ in FIG. 5) over a rectangular window having a ±4 pel range centered at $MV_{Dec}$. This full search uses the minimum 4×4 SSE over the searched window to select the best vector of the eighty-one considered for the refined candidate motion vector $MV_{Dec}$. The refined candidate motion vector scaled up by four is used as the sixth predictor in the next search.

As previously described, the block-matching in the decimated integer pel stage (i.e., $PS_5$ and $FS_4$ of FIG. 5) takes place on blocks that have been down sampled by a factor of four in each dimension. Because the relative macroblock size is smaller, searches can span larger areas of the frame at a much lower computational expense than if conducted at the full image resolution. At this stage, MVCost is not added to image distortion metrics for the motion vectors because motion estimation tends to be less reliable. That is, to use MVCost, the Lagrangian multiplier must be rescaled to reflect the smaller block matching size, in this case 4×4 pixels. A smaller multiplier produces a smaller MVCost, which can make the distortion component more prominent. Moreover, candidate motion vector(s) will ultimately be represented at quarter-pel resolution. Given how noisy decimated vectors become once scaled to this precision level (from 4× to 0.25×), MVCost may penalize any vector that seems to be uncorrelated with the candidate motion vector(s).

Returning to FIGS. 5 and 7, a candidate motion vector is found from searching over predictors and the upsampled refined candidate motion vector in which motion vector cost is used for single-partition motion vectors (706). In one or more embodiments of the invention, motion vector cost (MVCost) is used for the 16×16 motion vectors in this search process and subsequent search and refinement processes of the integer pel stage. As a precursor to the searches and refinement, a 16×16 motion vector $MV_{pred}$ is predicted by evaluating neighboring vectors using median filtering. As is explained in more detail below, this predicted motion vector and the quantization parameter QP are used to determine MVCost used in the integer pel stage.

In one or more embodiments of the invention, the upsampled refined candidate motion vector and the original un-scaled five predictors (i.e., the five predictors used in $PS_5$) are retried using a recurrent predictor search at full integer pel (denoted as $rPS_6$ in FIG. 5). In the recurrent predictor search, for each of these six vectors, a cost function is computed in which the respective MVCost of the vector is added to the block distortion (e.g., 16×16 SSE) of the vector and the single vector $MV_{Int\ 0}$ with the lowest overall Lagrangian cost is selected as the candidate motion vector.

This recurrent predictor search is especially important for cross-checking potentially noisy vectors selected in the decimated pel stage. That is, refinement from the decimated pel stage to the integer pel stage is inherently noisy because the initial MV candidate from the decimated pel stage is selected from downsampled information that contains just one sixteenth of the original image content. If the reference frame contains a large quantity of high visual frequencies, much of this information will be discarded to form the decimated reference frame. The recurrent predictor search is conducted to validate the result of the decimated pel stage using more accurate integer-pel 16×16 SSEs.

Figure 6:
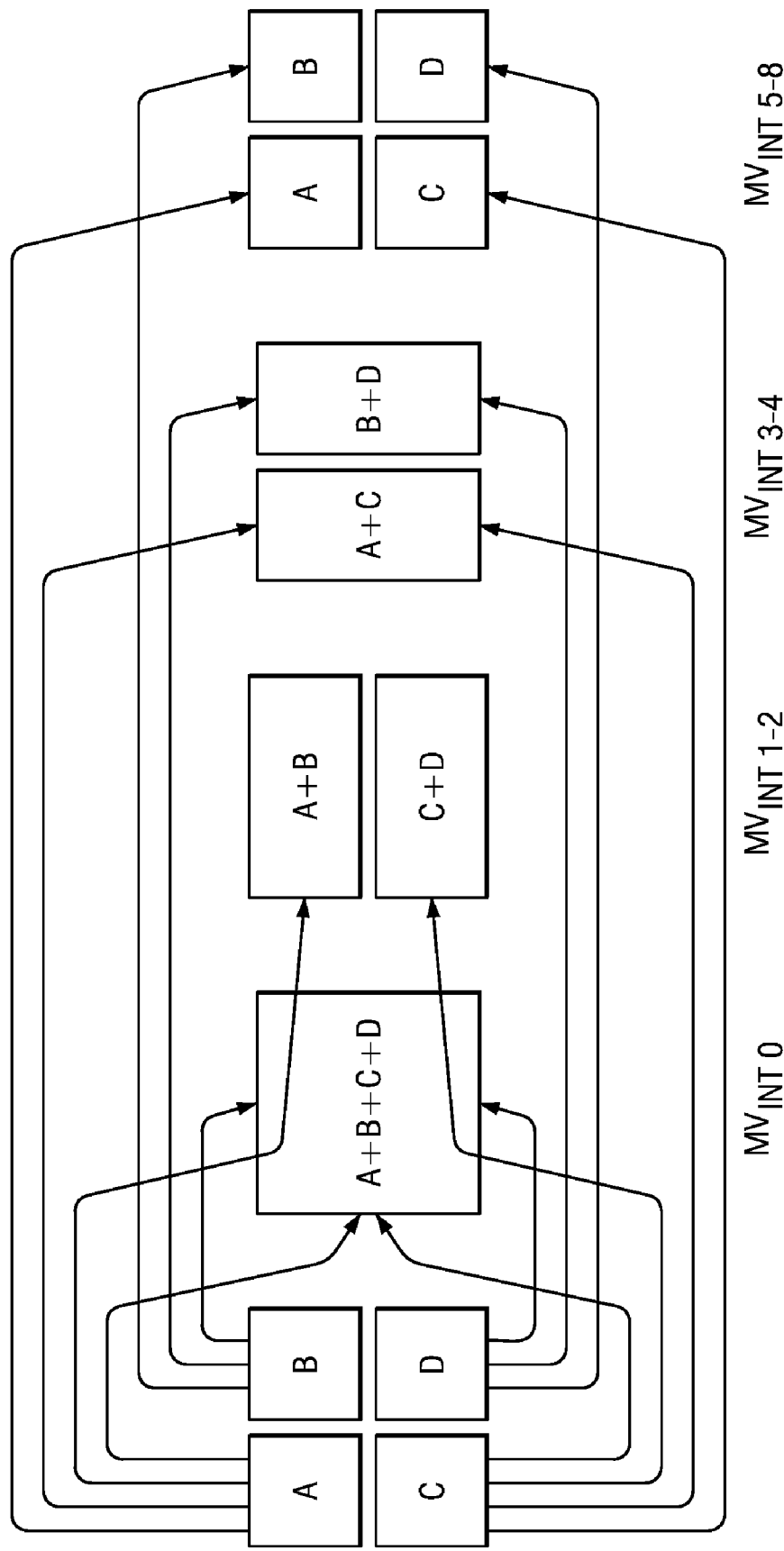
FIG. 6 shows a block diagram of partitioning for macroblock distortion measurement in accordance with one or more embodiments of the invention.

Returning to FIGS. 5 and 7, multiple candidate motion vectors are then selected from search centered at the selected candidate motion vector in which motion vector cost is used for single-partition motion vectors (708). More specifically, in one or more embodiments of the invention, a skip-pel box search (denoted as $SBS_3$ in FIG. 5) is performed over a ±3 pel area centered on the selected candidate motion vector $MV_{Int\ 0}$. The skip-bel box search performs block matching between a block in the current frame and nine blocks in a reference frame. The nine blocks are determined by the horizontal and vertical offset of +/−3 relative to the co-located position, i.e., offset vectors are (−3,−3), (0,−3), (3,−3), (−3,0), (0,0), (3,0), (−3,3), (0,3), and (3,3). Four modes are considered for each of the nine offset vectors. An efficient approach partitions the macroblock into four 8×8 partitions or sub-blocks. This macroblock partitioning is illustrated in FIG. 6. For each offset vector, the distortion, i.e., SSE or SAD, is measured in the four 8×8 partitions and combined to generate nine candidate partitions representing the four modes. By combining the distortion metrics of these four 8×8 partitions, the distortion for each of the nine locations associated with four different modes 0-3 can be determined. As each location in the search pattern is compared, the vector that produces the lowest distortion, i.e., $MV_{Int\ 0}$, $MV_{Int\ 1}$, $MV_{Int\ 2}$, $MV_{Int\ 3}$, $MV_{Int\ 4}$, $MV_{Int\ 5}$, $MV_{Int\ 6}$, $MV_{Int\ 7}$, $MV_{Int\ 8}$, (collectively referred to as $MV_{Int\ 0-8}$) is tracked. In each matching involving one of the nine offset vectors, the vector that achieves the lowest distortion, i.e. SAD score is determined.

The selected multiple candidate motion vectors are then refined using motion vector cost for single-partition motion vectors (710). More specifically, in one or more embodiments of the invention, each of the nine motion vectors $MV_{Int\ 0-8}$ are refined independently in another skip-pel box search over a ±1 pel area centered at each vector (denoted as $SBS_1$ in FIG. 5). The skip-pel box search calculates nine SADs, but to cover all four modes, these nine SADs are determined for each of the nine partition sub-blocks. The best vector from each of the nine partitions is supplied to the Mode Selection component, which decides the optimal inter-prediction mode. Thus, candidate motion vectors are selected for each hypothetical mode, i.e., a total of nine candidate motion vectors are selected—one 16×16, two 16×8, two 8×16, and four 8×8.

In both skip-pel box searches, the selection of the best single-partition motion vector candidate (e.g., the 16×16 vectors) is determined using a cost function that includes both a block distortion measure and a motion vector cost measure, i.e., using the lowest Lagrangian cost, i.e., J(v, q, v, m); whereas, the multi-partition motion vector candidates are selected using only a cost function that includes a distortion measure without a motion vector cost measure, i.e., using the lowest SSE or SAD. During the refinement in the skip-pel box searches, the distortion (SSE or SAD) and MVCost are tracked separately for the 16×16 vector block so that subsequent mode selection is not unfairly biased. However, the vector for the 16×16 block partition, i.e., the motion vector corresponding to the single-partition mode, is influenced by the lowest Lagrangian cost versus the lowest distortion. Recall that the quantization parameter, q (QP in FIG. 5), the mode type bits, m, and the corresponding estimated motion vector bits, v, must be known before MVCost can be measured. The mode type bits m, which are necessary overhead for labeling the macroblock's mode, is fixed and easily represented using a small look-up table, such that $$m_u(k) = \begin{cases} 1 & u = 0 \\ \{3, 3\} & u = \{1, 2\} \\ \{9, 9, 9, 9\} & u = 3, \end{cases}$$

where u is the mode. For N=M=16, mode u assumes the following partition sizes: 0≡16×16, 1≡16×8, 2≡8×16, 3≡8×8.

To determine v, both the candidate and the predicted vectors are acquired. The optimal solution calls for iterative modeling of all the partition modes. However, from empirical observations using a broad suite of test video, the inter-prediction mode distribution revealed a clear majority for single vector macroblocks. Since there is no complicated vector dependency for a single partition and given the high likelihood that a single motion vector will be sufficient, the predictive vector is only calculated for the 16×16 MV case. The same median prediction used by H.264/AVC's vector coding routines is applied to determine this predicted 16×16 vector. Consequently, MVCost is only applied when selecting and tracking the 16×16 vector, and other candidate partitions, e.g., 16×8, 8×16, and 8×8, are selected and tracked using only the SAD or SSE distortion metric. The bits consumed by v are determined by universal variable length coding (UVLC) as defined by H.264/AVC.

Returning to FIGS. 5 and 7, the macroblock inter-prediction mode and the corresponding candidate vector(s) are determined using motion vector cost for all of the refined selected candidate motion vectors (712). More specifically, in one or more embodiments of the invention, mode selection evaluates the quantization parameter, the motion vector context of the macroblock, and the distortion, and the MVCost for all nine candidate motion vectors. The overall error for each of the four inter-prediction modes is calculated and the inter-prediction mode with the lowest total cost is selected. That is, the mode is selected using the following criteria:

$$\text{mode } \hat{\mu}(q) = \left\{ \min_{\mu \in W} \left\{ \min_{v \in A} \left\{ \text{dist}(v) + \lambda(q) \sum_{k=0}^{K_\mu - 1} \left( v_\mu(k)^2 + \frac{m_\mu(k)}{\alpha} \right) \right\} \right\} \right\} 0 < q < 46$$

where W=4 and α=2. From observation during low bit-rate operation in H.264/AVC, this expression for mode selection can produce less favorable results when q>46, in which case, û=0 is selected by default. Note that MVCost is added to SSE for all nine of the candidate motion vectors; that is, a cost function is used for each of the candidate motion vectors that includes both a distortion measure and a motion vector cost measure. Associated with each MVCost measure is a predicted vector, which is based on the residual vector coding approach applied by the standard. For example, H.264 median filters the vectors of neighboring blocks per the appropriate context. The output of the mode selection is the selected inter-prediction mode and the candidate motion vector(s) that correspond to that mode, i.e., $MV_{Int\ 0,\ \{1,2\},\ \{3,4\}\ or\ \{5,6,7,8\}}$.

Once the inter-prediction mode is determined, the candidate motion vector(s) corresponding to the inter-prediction mode are then refined using motion vector cost for single-partition mode vectors (714). More specifically, in one or more embodiments of the invention, sub-integer pel motion vector(s) are found from searches over half and quarter pel regions with the candidate motion vector(s) corresponding to the inter-prediction mode. In these searches, motion vector cost is used for the 16×16 vector $MV_{Int\ 0}$ if Mode 0 is the selected mode. Further, the same predicted vectors that were used for mode selection (as mentioned above) are used to determine the MVCost for each vector so that the LaGrangian cost J(v, q, v, m) can be determined.

For the search over the half pel region, the local region of the candidate motion vector(s) is interpolated to provide ½ pel resolution. Half-pel refinement is then performed in the form of a full search (denoted as $FS_{0.5}$ in FIG. 5) over a ±0.5 pel range centered at the motion vector(s). This calculation involves 9 SAD calculations for each partition. For example, if Mode 0 is selected 9 16×16 SADs will be calculated using interpolated values. However, if Mode 3 is selected, 9 8×8 SADs will be calculated using interpolated values for each of the 4 sub-blocks.

The local region of the candidate motion vector(s) from the half-pel refinement are then interpolated to provide ¼ pel resolution. Quarter-pel refinement is then performed in the form of a full search (denoted as $FS_{0.25}$ in FIG. 5) over a ±0.25 pel range centered at the motion vector(s). The best motion vector(s) from the quarter-pel refinement are selected as the motion vector(s) for the macroblock.

Figure 8:
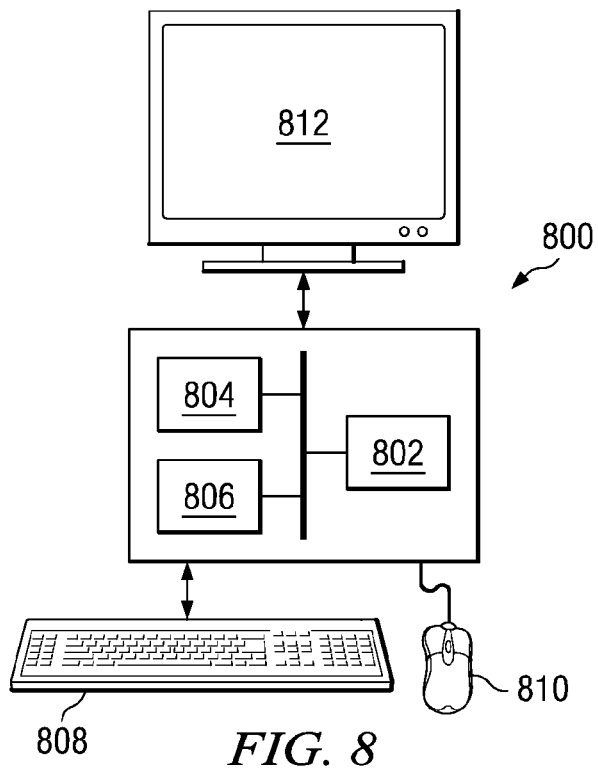
FIG. 8 shows an illustrative digital system in accordance with one or more embodiments.

Embodiments of the methods and encoders described herein may be implemented on virtually any type of digital system (e.g., a desk top computer, a laptop computer, a digital video recorder, a handheld device such as a mobile phone, a personal digital assistant, a video camera, an MP3 player, an iPod, etc.). For example, as shown in FIG. 8, a digital system (800) includes a processor (802), associated memory (804), a storage device (806), and numerous other elements and functionalities typical of today's digital systems (not shown). In one or more embodiments of the invention, a digital system may include multiple processors and/or one or more of the processors may be digital signal processors. The digital system (800) may also include input means, such as a keyboard (808) and a mouse (810) (or other cursor control device), and output means, such as a monitor (812) (or other display device). The digital system (800) may be connected to a network (814) (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (800) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. An infinite combination of search tools can be concatenated to implement a particular motion estimation algorithm. For example, motion estimation algorithm could eliminate the decimated-pel and sub-integer-pel stages while still taking advantage of the principle benefits described in this disclosure. Accordingly, the scope of the invention should be limited only by the attached claims.

It is therefore contemplated that the appended claims will cover any such modifications of the embodiments as fall within the true scope and spirit of the invention.

What is claimed is:

1. A method of motion vector determination for video encoding comprising:
    selecting a plurality of candidate motion vectors for a macroblock using a cost function including both a block distortion measure and a motion vector cost measure for single-partition motion vectors in the plurality of candidate motion vectors and using a cost function including a distortion measure without a motion vector cost measure for multi-partition motion vectors in the plurality of candidate motion vectors; and
    refining the plurality of candidate motion vectors to obtain a refined plurality of candidate motion vectors, wherein multi-partition motion vectors of the plurality of candidate motion vectors are refined using a cost function including a distortion measure without a motion vector cost measure and single-partition motion vectors of the plurality of candidate motion vectors are refined using a cost function including both a block distortion measure and a motion vector cost measure, wherein the cost function for each candidate motion vector is determined by:

$$\left\{ \min_{\mu \in W} \left\{ \min_{v \in A} \left\{ \text{dist}(v) + \lambda(q) \sum_{k=0}^{K_\mu - 1} \left( v_\mu(k)^2 + \frac{m_\mu(k)}{\alpha} \right) \right\} \right\} \right\},$$

where dist is one selected from a group consisting of SSE and SSD, μ is a mode, λ is a Lagrangian multiplier, α is a constant corresponding to a video compression standard, $m_\mu$ is mode bits for mode μ, v is the candidate motion vector, v is bits for the candidate motion vector difference, W is a number of modes, and q is a Quantization parameter.

2. The method of claim 1, wherein the cost function including both a block distortion measure and a motion vector cost measure is computed using a predicted motion vector corresponding to a single-partition mode and a candidate motion vector corresponding to the single-partition mode.

3. The method of claim 1, wherein selecting the plurality of candidate motion vectors further comprises:

partitioning the macroblock into a plurality of partitions, wherein each partition of the plurality of partitions corresponds to an inter-prediction mode;

combining distortion measures for each partition of the plurality of partitions to generate a plurality of candidate partitions; and selecting a candidate motion vector for each candidate partition of the plurality of candidate partitions, wherein a cost function including both a block distortion measure and a motion vector cost measure is used for a motion vector of the candidate partition corresponding to a single-partition inter-prediction mode, and a cost function including a distortion measure without a motion vector cost measure is used for a motion vector of the candidate partition corresponding to a multiple-partition inter-prediction mode.

4. The method of claim 1, further comprising:

determining an inter-prediction mode for the macroblock using a cost function for each candidate motion vector of the refined plurality of candidate motion vectors, wherein the cost function includes both a distortion measure and a motion vector cost measure; and selecting at least one candidate motion vector corresponding to the mode from the refined plurality of candidate motion vectors.

5. The method of claim 4, further comprising:

refining the at least one candidate motion vector to obtain at least one refined candidate motion vector, wherein when the mode is a single-partition mode, the at least one candidate motion vector is refined using a cost function including both a block distortion measure and a motion vector cost measure.

6. The method of claim 1, further comprising:

selecting a candidate motion vector from a plurality of predicted motion vectors for the macroblock using a cost function including a distortion measure without a motion vector cost measure; and refining the candidate motion vector using a cost function including a distortion measure without a motion vector cost measure to obtain a refined candidate motion vector.

7. The method of claim 6, further comprising:

selecting a candidate motion vector from the plurality of predicted motion vectors and the refined candidate motion vector using a cost function including both a block distortion measure and a motion vector cost measure, wherein the plurality of predicted motion vectors and the refined candidate motion vector are single-partition motion vectors.

8. A video encoder for encoding video frames, wherein encoding a video frame comprises determining a motion vector by:

selecting a plurality of candidate motion vectors for a macroblock using a cost function including both a block distortion measure and a motion vector cost measure for single-partition motion vectors in the plurality of candidate motion vectors and using a cost function including a distortion measure without a motion vector cost measure for multi-partition motion vectors in the plurality of candidate motion vectors; and refining the plurality of candidate motion vectors to obtain a refined plurality of candidate motion vectors, wherein multi-partition motion vectors of the plurality of candidate motion vectors are refined using a cost function including a distortion measure without a motion vector cost measure and single-partition motion vectors of the plurality of candidate motion vectors are refined using a cost function including both a block distortion measure and a motion vector cost measure, wherein the cost function for each candidate motion vector is determined by:

$$\left\{ \min_{\mu \in W} \left\{ \min_{v \in A} \left\{ \text{dist}(v) + \lambda(q) \sum_{k=0}^{K_\mu - 1} \left( v_\mu(k)^2 + \frac{m_\mu(k)}{\alpha} \right) \right\} \right\} \right\},$$

where dist is one selected from a group consisting of SSE and SSD, $\mu$ is a mode, $\lambda$ is a Lagrangian multiplier, $\alpha$ is a constant corresponding to a video compression standard, $m_\mu$ is mode bits for mode $\mu$, v is the candidate motion vector, v is bits for the candidate motion vector difference, W is a number of modes, and q is a quantization parameter.

9. The video encoder of claim 8, wherein the cost function including both a block distortion measure and a motion vector cost measure is computed using a predicted motion vector corresponding to a single-partition mode and a candidate motion vector corresponding to the single-partition mode.

10. The video encoder of claim 8, wherein selecting the plurality of candidate motion vectors further comprises:

partitioning the macroblock into a plurality of partitions, wherein each partition of the plurality of partitions corresponds to an inter-prediction mode;

combining distortion measures for each partition of the plurality of partitions to generate a plurality of candidate partitions; and selecting a candidate motion vector for each candidate partition of the plurality of candidate partitions, wherein a cost function including both a block distortion measure and a motion vector cost measure is used for a motion vector of the candidate partition corresponding to a single-partition inter-prediction mode, and a cost function including a distortion measure without a motion vector cost measure is used for a motion vector of the candidate partition corresponding to a multiple-partition inter-prediction mode.

11. The video encoder of claim 8, wherein encoding a video frame further comprises determining a motion vector by:

determining an inter-prediction mode for the macroblock using a cost function for each candidate motion vector of the refined plurality of candidate motion vectors, wherein the cost function includes both a distortion measure and a motion vector cost measure; and selecting at least one candidate motion vector corresponding to the mode from the refined plurality of candidate motion vectors.

12. The video encoder of claim 11, further comprising:

refining the at least one candidate motion vector to obtain at least one refined candidate motion vector, wherein when the mode is a single-partition mode, the at least one candidate motion vector is refined using a cost function including both a block distortion measure and a motion vector cost measure.

13. The video encoder of claim 8, wherein encoding a video frame further comprises determining a motion vector by:

selecting a candidate motion vector from a plurality of predicted motion vectors for the macroblock using a cost function including a distortion measure without a motion vector cost measure; and refining the candidate motion vector using a cost function including a distortion measure without a motion vector cost measure to obtain a refined candidate motion vector.

14. The video encoder of claim 13, wherein encoding a video frame further comprises determining a motion vector by:
  selecting a candidate motion vector from the plurality of predicted motion vectors and the refined candidate motion vector using a cost function including both a block distortion measure and a motion vector cost measure, wherein the plurality of predicted motion vectors and the refined candidate motion vector are single-partition motion vectors.

15. A digital system comprising a video encoder for encoding video frames wherein encoding a video frame comprises determining a motion vector by:
  selecting a plurality of candidate motion vectors for a macroblock using a cost function including both a block distortion measure and a motion vector cost measure for single-partition motion vectors in the plurality of candidate motion vectors and using a cost function including a distortion measure without a motion vector cost measure for multi-partition motion vectors in the plurality of candidate motion vectors, wherein the cost function for each candidate motion vector is determined by:

$$\left\{ \min_{\mu \in W} \left\{ \min_{v \in A} \left\{ dist(v) + \lambda(q) \sum_{k=0}^{K_\mu - 1} \left( v_\mu(k)^2 + \frac{m_\mu(k)}{\alpha} \right) \right\} \right\} \right\},$$

where dist is one selected from a group consisting of SSE and SSD, $\mu$ is a mode, $\lambda$ is a Lagrangian multiplier, $\alpha$ is a constant corresponding to a video compression standard, $m_\mu$ is mode bits for mode $\mu$, v is the candidate motion vector, v is bits for the candidate motion vector difference, W is a number of modes, and q is a quantization parameter; and
  refining the plurality of candidate motion vectors to obtain a refined plurality of candidate motion vectors, wherein multi-partition motion vectors of the plurality of candidate motion vectors are refined using a cost function including a distortion measure without a motion vector cost measure and single-partition motion vectors of the plurality of candidate motion vectors are refined using a cost function including both a block distortion measure and a motion vector cost measure.

16. The digital system of claim 15, wherein the cost function including both a block distortion measure and a motion vector cost measure is computed using a predicted motion vector corresponding to a single-partition mode and a candidate motion vector corresponding to the single-partition mode.

17. The digital system of claim 15, wherein selecting the plurality of candidate motion vectors further comprises:
  partitioning the macroblock into a plurality of partitions, wherein each partition of the plurality of partitions corresponds to an inter-prediction mode;
  combining distortion measures for each partition of the plurality of partitions to generate a plurality of candidate partitions; and
  selecting a candidate motion vector for each candidate partition of the plurality of candidate partitions, wherein a cost function including both a block distortion measure and a motion vector cost measure is used for a motion vector of the candidate partition corresponding to a single-partition inter-prediction mode, and a cost function including a distortion measure without a motion vector cost measure is used for a motion vector of the candidate partition corresponding to a multiple-partition inter-prediction mode.

18. The digital system of claim 15, wherein encoding a video frame further comprises determining a motion vector by:
  determining an inter-prediction mode for the macroblock using a cost function for each candidate motion vector of the refined plurality of candidate motion vectors, wherein the cost function includes both a distortion measure and a motion vector cost measure; and
  selecting at least one candidate motion vector corresponding to the mode from the refined plurality of candidate motion vectors.

* * * * *